(12) United States Patent
Bossler

(10) Patent No.: US 6,474,327 B1
(45) Date of Patent: Nov. 5, 2002

(54) BARBECUE CART ASSEMBLY

(75) Inventor: Martin C. Bossler, Spring Grove, IL (US)

(73) Assignee: Uniflame Corporation, Zion, IL (US)

( * ) Notice: Subject to any disclaimer, the term of this patent is extended or adjusted under 35 U.S.C. 154(b) by 0 days.

(21) Appl. No.: 09/602,928

(22) Filed: Jun. 23, 2000

(51) Int. Cl.[7] .............................. A47J 37/00; F24C 3/00
(52) U.S. Cl. ...................... 126/41 R; 126/25 R; 126/50; 211/181.1; 211/187; 248/245; 248/129
(58) Field of Search .......................... 126/25 R, 41 R, 126/9 R, 40, 50, 30; D7/403, 402; D6/484; 108/147.13; 211/181.1, 187; 248/412, 129, 423, 245, 411, 243, 413; 99/446, 449, 450

(56) References Cited

U.S. PATENT DOCUMENTS

| | | |
|---|---|---|
| D214,220 S | 5/1969 | Halen |
| 3,523,508 A | 8/1970 | Maslow |
| 3,757,705 A | 9/1973 | Maslow |
| 4,362,093 A * | 12/1982 | Griscom .................... 126/25 R |
| 5,027,788 A | 7/1991 | Schlosser et al. |
| 5,033,448 A * | 7/1991 | Sandweg ..................... 126/50 |
| D327,390 S | 6/1992 | Schlosser et al. |
| 5,307,789 A * | 5/1994 | Newby ........................ 126/30 |
| 5,390,803 A | 2/1995 | McAllister |
| D375,436 S | 11/1996 | Bird et al. |
| 5,638,808 A * | 6/1997 | Home ....................... 126/25 R |
| D439,109 S * | 3/2001 | Pai .............................. D7/402 |
| D441,254 S * | 5/2001 | Pai .............................. D7/403 |

* cited by examiner

Primary Examiner—James C. Yeung
(74) Attorney, Agent, or Firm—Greer, Burns & Crain, Ltd.

(57) ABSTRACT

A cart configured for receiving a kettle-type barbecue having a lid and a kettle portion, the cart including a lower bracket having at least three corners, each corner having a first female frusto-conical section shape and being configured to receive and securely hold a corner post having a male frusto-conical section shape. An upper bracket has at least three corners, each corner having a second female frusto-conical section shape and being configured to receive and securely hold a corner post having a male frusto-conical section shape. Also provided are a plurality of corner posts having a plurality of spaced annular grooves, and a plurality of male frusto-conical members configured for engaging the grooves and being disposed at a selected position on the corresponding corner post for engaging the female frusto-conical shapes on the corners. A kettle bracket is associated with the upper bracket and is configured for receiving the kettle portion of the barbecue in a frictional relationship. Also provided is a lower bracket for use with a cart for supporting a barbecue, the lower bracket including a plurality of generally parallel, spaced load rods having first and second ends, a first support rod secured to a plurality of the first ends, a second support rod secured to a plurality of the second ends and a retaining wall secured to each of the support rods to project above a plane defined by the load rods.

24 Claims, 6 Drawing Sheets

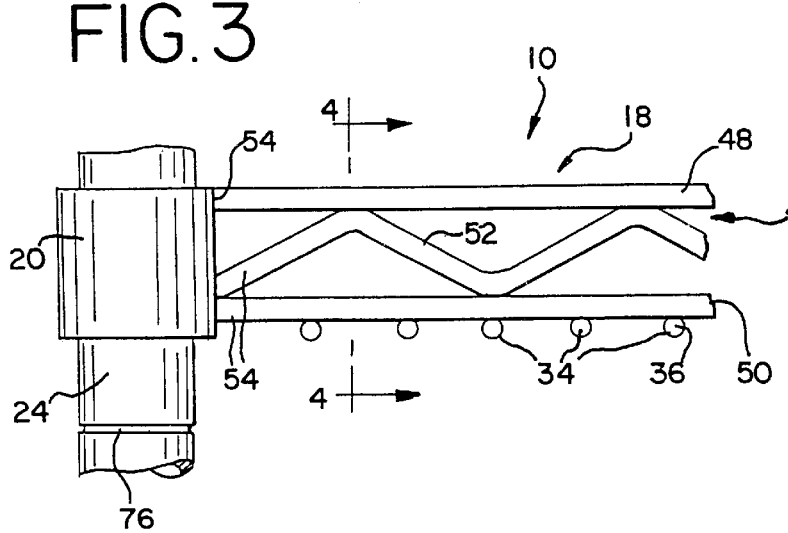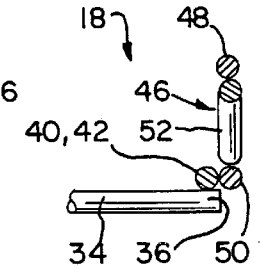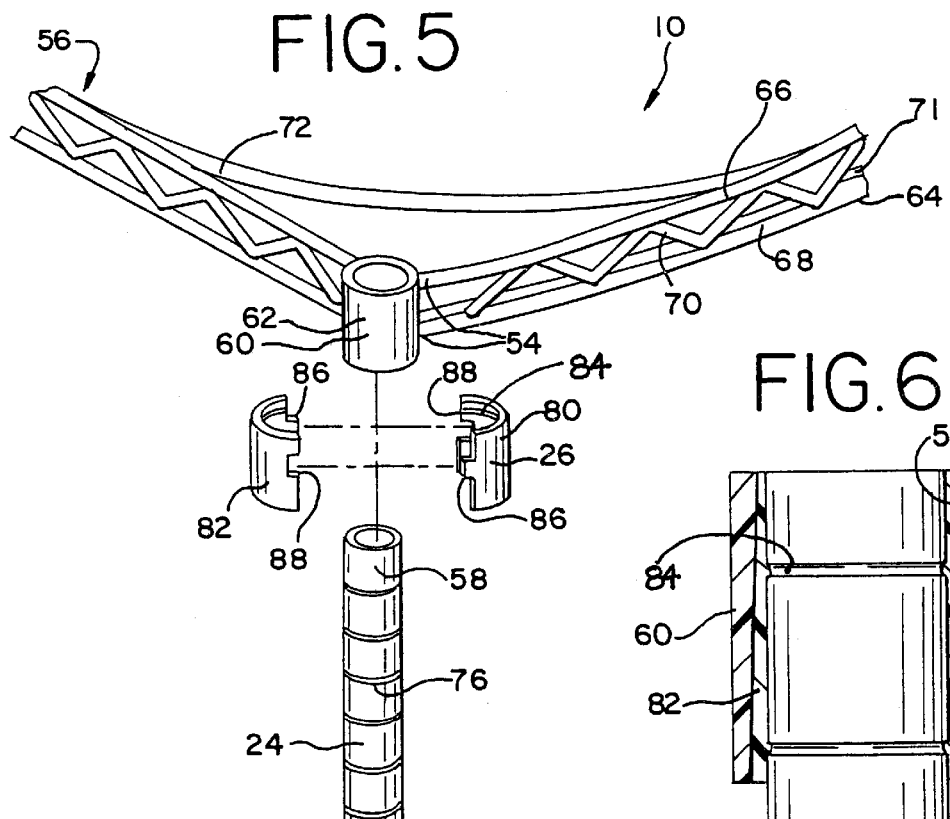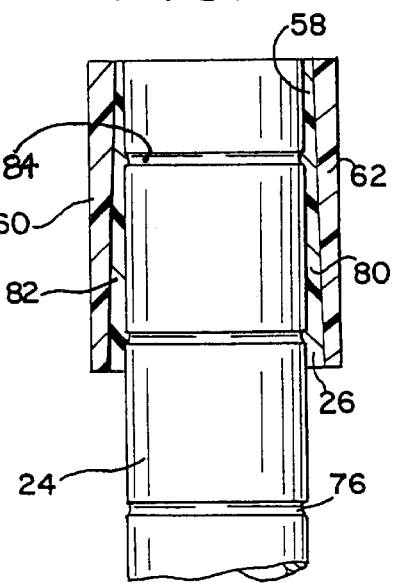

BARBECUE CART ASSEMBLY

BACKGROUND OF THE INVENTION

The present invention generally relates to easily assembled outdoor furniture and/or shelving, and more particularly to a cart for a covered or kettle-type barbecue which is readily assembled without the use of threaded fasteners.

Conventional barbecues are typically packaged in disassembled format to more efficiently use retail display and storage space and also to save on shipping and handling costs. In the store, sample models of barbecues are often shown assembled for display purposes, but the purchasing customer must buy the grill in the boxed format and take it home to assemble it or have another party assemble it for him. Some retail establishments provide in-store assembly as a customer service. Whether the barbecue is assembled in the store by store personnel for the customer to take home, or by the customer himself once the grill is brought home, grill assembly is often a very tedious and/or complicated procedure, especially when gas grills are involved or where the customer is inexperienced in the use of hand tools.

Since mass market retailers are moving more and more towards reducing support staff wherever possible, the labor involved in assembling barbecues is a significant disincentive to providing this feature to customers. Employees tapped to assemble grills have often been pulled from more pressing duties.

Regardless of who performs the task, the assembly of a typical barbecue involves attaching legs to a kettle or bowl at the upper end of the legs, and often securing the legs by threaded fasteners such as screws or bolts. Alternatively, frames or carts must be assembled and secured by threaded fasteners. In addition, legs are typically supported at their lower ends for strength purposes by a lower bracket or shelf. Typically, this lower bracket also needs to be secured to the legs by threaded fasteners. At least one pair of wheels are also standard equipment on most conventional barbecues and require attachment to the legs or some portion of the frame. More advanced or expensive barbecues include side shelves to provide a place for plates, cooking utensils or condiments. Gas grills often require special brackets and fittings for the attachment of the liquid petroleum fuel tank.

The more complicated the design, and the more features such as shelves cabinets etc. which are provided, the longer assembly will take. Also, the more skilled the assembler must be, since very often components can be more quickly assembled by those having more experience, who learn the "tricks" of assembling particular designs. Conversely, inexperienced assemblers will often take unreasonably long periods of time to assemble grills with which they are unfamiliar.

Another drawback of conventional barbecue designs, is that the different configurations of lower portions, bowls or kettles often require individualized fastening arrangements or technologies.

Accordingly, it is a first object of the present invention to provide an improved barbecue cart which is easily assembled without the use of threaded fasteners.

Another object of the present invention is to provide an improved barbecue cart which includes shelves which can easily be adjusted as to their height without the use of threaded fasteners.

Yet another object of the present invention is to provide an improved barbecue cart assembly which is configured for receiving and retaining the barbecue bowl or kettle with a snap-type friction fit arrangement not requiring any fasteners.

BRIEF SUMMARY OF THE INVENTION

The above-identified objects are met or exceeded by the present barbecue cart assembly, which features a readily assembled cart design including a plurality of legs, most preferably three or four to which are attached upper and lower brackets using a wedge-type friction fit arrangement. The upper bracket includes a clamp configured to circumscribe the lower portion of the grill also known as the bowl or kettle to frictionally retain the grill therein. Optionally, cantilever-type accessory or utensil shelves project from sides of the grill and are secured to the frame in the same manner as the upper and lower brackets. Also contemplated are pivoting light duty shelves or hanging brackets which are secured to one leg only by a similar wedge clamping arrangement.

More specifically, a cart is provided configured for receiving a kettle-type barbecue having a lid and a kettle portion, the cart including a lower bracket having at least three corners, each corner having a first female frusto-conical section shape and being configured to receive and securely hold a corner post having a male frusto-conical section shape. An upper bracket has at least three corners, each corner having a second female frusto-conical section shape and being configured to receive and securely hold a corner post having a male frusto-conical section shape. Also provided are a plurality of corner posts having a plurality of spaced annular grooves, and a plurality of male frusto-conical members configured for engaging the grooves and being disposed at a selected position on the corresponding corner post for engaging the female frusto-conical shapes on the corners. A kettle bracket is associated with the upper bracket and is configured for receiving the kettle portion of the barbecue in a frictional relationship.

In another embodiment, also provided is a lower bracket for use with a cart for supporting a barbecue, the lower bracket including a plurality of generally parallel, spaced load rods having first and second ends, a first support rod secured to a plurality of the first ends, a second support rod secured to a plurality of the second ends and a retaining wall secured to each of the support rods to project above a plane defined by the load rods.

BRIEF DESCRIPTION OF THE SEVERAL VIEWS OF THE DRAWINGS

FIG. 3 is a fragmentary sectional view taken along the line 3—3 of FIG. 2 and in the direction generally indicated;

FIG. 4 is a fragmentary sectional view taken along the line 4—4 of FIG. 3 and in the direction generally indicated;

FIG. 5 is an exploded fragmentary perspective view of the frame depicted in FIG. 2;

FIG. 6 is a fragmentary, partial sectional view taken along the line 6—6 of FIG. 2;

DETAILED DESCRIPTION OF THE INVENTION

Figure 1:
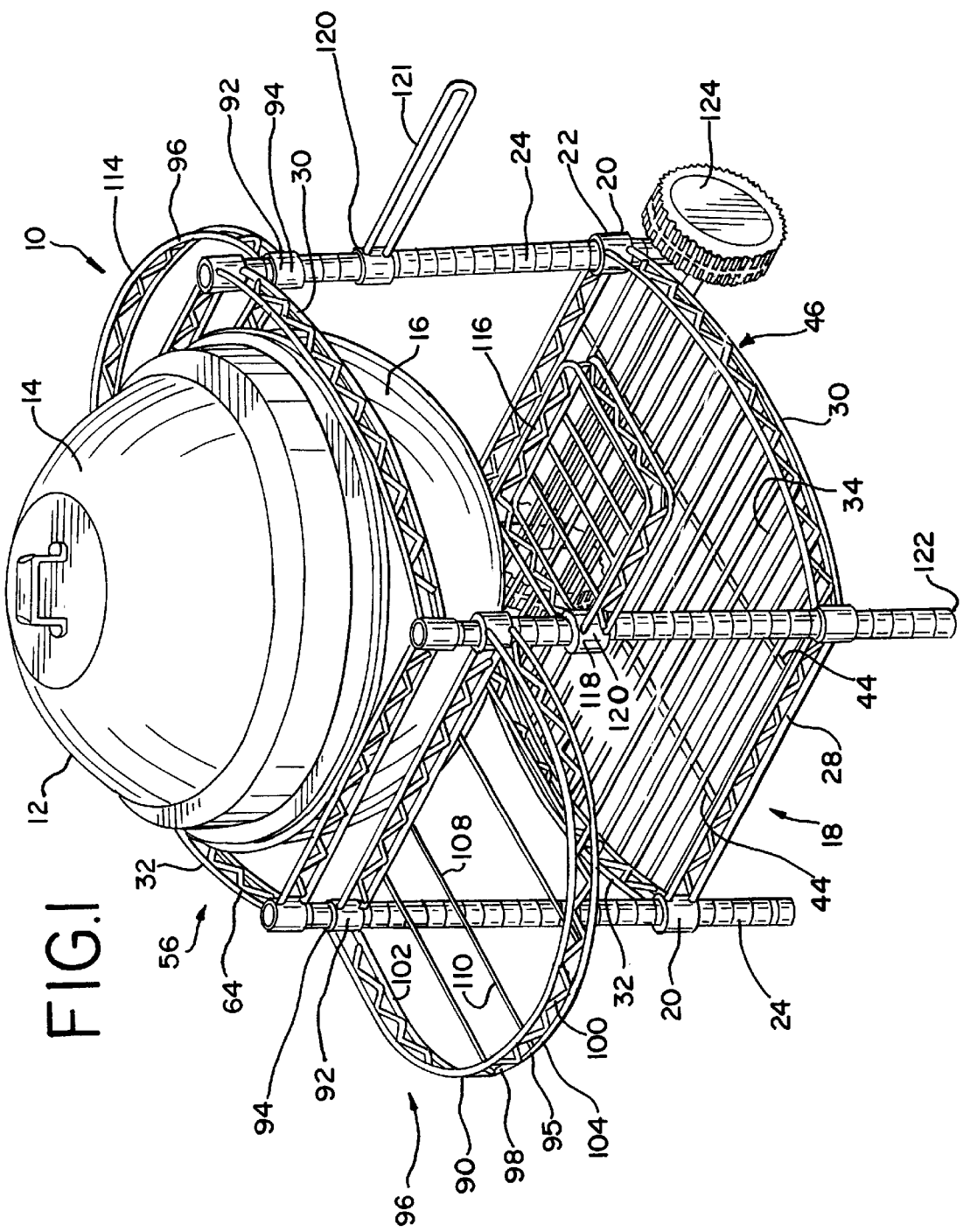
FIG. 1 is a top perspective view of the present barbecue cart shown with a kettle-type barbecue mounted thereto.
Figure 2:
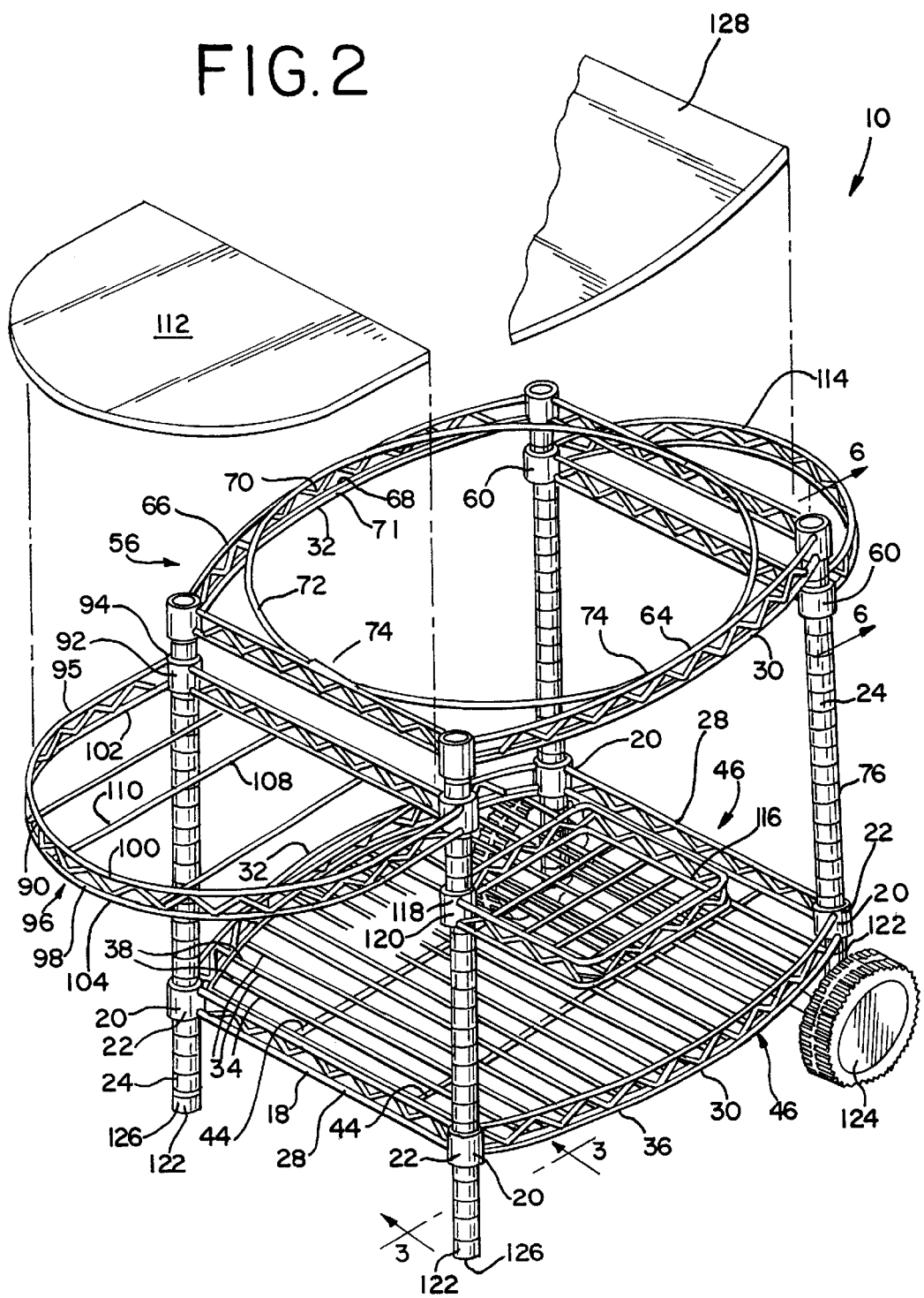
FIG. 2 is a top perspective view of the cart of FIG. 1 shown alone, with shelf units shown exploded therefrom.

Referring now to FIGS. 1 and 2, the barbecue cart of the present invention is generally designated 10. In the preferred embodiment, the cart 10 is configured for receiving a kettle-type barbecue 12 having a lid 14 and a bowl portion 16. It is contemplated that the barbecue 10 may be charcoal or gas-fueled, and that the bowl portion 16 is configured to accommodate at least one grill (not shown) for supporting food being cooked, as is known in the art. If desired, adjustable air vents 17 (FIG. 7) may also be provided as are also known in the art. As seen below, the present cart 10 may be configured to receive a variety of configurations of commercially available barbecues 12.

Referring now to FIGS. 2–6, a feature of the present cart 10 is that it is easily assembled without the use of threaded fasteners, and can be readily assembled without the use of threaded fasteners, and preferably is assembled without any tool besides a hammer or mallet. In the preferred embodiment, this feature is achieved by providing a lower bracket 18 having at least three corners 20, each corner having a first tubular female frusto-conical section shape 22 and being configured to receive and securely hold a corner post 24 having a male frusto-conical section shape 26. Each female frusto-conical section shape 22 is preferably integrally attached to the lower bracket 18 as by welding, casting or injection molding.

In the preferred embodiment, the lower bracket 18 has four corners 20 and is generally rectangular in shape, with generally straight side edges 28, and slightly curved front and rear edges 30, 32 respectively. However, it is contemplated that other shapes for the lower bracket 18 may be employed, depending on the application, and including, square, triangular, other polygonal shapes, circular, and elliptical.

The lower bracket 18 includes a plurality of generally parallel, spaced load rods 34 having first and second ends 36, 38, a first support rod 40 secured to a plurality of, and preferably all of the first ends, and a second support rod 42 secured to a plurality of the second ends. Since the construction of the ends of the lower bracket 18 in sectional view is virtually identical for the front and rear edges 30, 32, FIG. 4 will be understood to represent a typical portion of that periphery. In addition, at least one and preferably two supplemental support rods 44 are preferably provided in spaced, midspan relationship for strengthening the load rods 34, as is well known in the art of wire shelving (best seen in FIG. 2).

Referring now to FIGS. 2–4, a retaining wall 46 is secured to each of the support rods 40, 42, and also preferably to the side edges 28 of the lower bracket 18, to project above a plane defined by the load rods 34 and to retain objects placed on the shelf defined by the load rods. The retaining wall 46 is preferably made of a similar type of wire to that used to make the lower bracket, 18, and may take many forms, but in the preferred embodiment the retaining wall includes an upper rod 48, a lower rod 50 spaced from the upper rod, and a serpentine rod 52. The serpentine rod 52 is disposed between and attached to the upper and lower rods 48, 50, as by welding, casting molding or chemical adhesives. In the preferred embodiment, the serpentine rod 52 is formed into a generally regular triangle, however other angular or curved repetitive patterns are contemplated as desired and as may suit a particular application. It is also preferred that ends 54 of the rods 48, 50 and 52 are secured, as by welding, casting, injection molding or chemical adhesives, to the nearest female frusto-conical section shapes 22 located at the adjacent corner 20.

An upper bracket 56 is provided for supporting upper ends 58 of the corner posts 24, and also for receiving and securely retaining the barbecue 12, specifically the bowl portion 16. Like the lower bracket 18, the upper bracket 56 has at least three and preferably four corners 60, each corner having a second female frusto-conical section shape 62 and being configured to receive and securely hold one of the corner posts 24 having a male frusto-conical section shape 26. The configuration of the shapes 22, 62 are preferably identical.

As best seen in FIGS. 1, 2 and 5, the upper bracket 56 appears generally polygonal, and preferably rectangular when viewed from above, although the front and rear edges 30, 32 are slightly arced or curved as in the lower bracket 18. The upper bracket 56 includes a serpentine support wall 64 including generally parallel upper and lower rods 66, 68 respectively, and a serpentine rod 70 sandwiched therebetween. As is the case with the retaining wall 46, the serpentine rod 70 is attached to the upper and lower rods 66, 68 by welding, casting, molding or chemical adhesives. Further, the upper and lower rods, 66, 68, and optionally the serpentine rod 70, are attached to each of the corners 60 in the same manner as in the lower bracket 18. If desired, a supplemental rod 71 (best seen in FIG. 5) may be provided behind the lower rod 68.

A main feature of the upper bracket 56 not found in the lower bracket 18 is a kettle bracket 72 associated with the upper bracket and configured for receiving the bowl portion 16 portion of the barbecue 12 in a frictional relationship. In the preferred embodiment, the kettle bracket 72 is a rod similar in diameter and material to that used to fabricate the upper bracket 56, however other dimensions and materials are contemplated.

Referring now to FIG. 1, when the barbecue 12 is generally spherical in configuration, the kettle bracket 72 is generally circular, and is dimensioned to snugly and fictionally engage the exterior of the bowl portion 16. However, it is contemplated that the kettle bracket 72 will be provided in a configuration which will conform to, or otherwise frictionally engage, the outer periphery of the bowl portion 16, regardless of the particular shape of the bowl. In the preferred embodiment, the kettle bracket 72 is secured to the upper bracket 56 at four points 74, one at each of the sides, front and rear 28, 30, 32 of the present cart 10 (best seen in FIG. 2).

Referring now to FIGS. 5 and 6, the system used to secure each of the lower and upper brackets 18, 56 to the corner posts 24 at the respective corners 20, 60 includes the use of a plurality of spaced, parallel annular grooves 76 on each of the corner posts. A plurality of the male frusto-conical members 26 are configured for engaging the grooves 76 and include first and second halves 80, 82, each with an inwardly radially projecting lip dimensioned for engaging a selected groove 76. The halves 80, 82 are mirror images of each other, and each have a vertical edge with a lug 86, and a vertical edge with a recess 88. The halves are configured to be assembled in circumscribing fashion about one of the corner posts 24 so that the lugs and recesses 86, 88 of opposing edges engage each other. A slight frictional fit is preferred, so that the frusto-conical member 26 will remain on the post 24 until the corner 20 or 60 is lowered over it to secure the corner to the corner post at that location. Preferably, the members 26 will all be positioned at the same height, or in the corresponding (same height) groove 76 on each post 24.

A vertical downward force on the bracket 18, 56, or the corresponding corner 20, 60 will create a tight, frictional wedging engagement between the corner and the frusto-conical member 26 (best seen in FIG. 6). This type of system is disclosed for suspending wire shelves and is disclosed in U.S. Pat. Nos. 3,757,705 and 3,523,508, which are incorporated by reference herein.

Referring now to FIGS. 1 and 2, aside from providing a fast and relatively easy assembly procedure for a barbecue cart, another feature of the present cart 10 is that the above-described corner mounting system is used to provide a variety of attachments for the cart which are all easily assembled without the use of fasteners, and preferably without the use of threaded fasteners. These attachments include at least one shelf 90 having a pair of support corners 92, each support corner having a female frusto-conical section shape 94 and being configured to receive and securely hold one of the corresponding corner posts 24 having a male frusto-conical section shape 26 engaged thereto so that the shelf is cantilevered from the cart 10. Each shelf 90 preferably includes a peripheral wall 95 made of an upper rod 96, a lower rod 98 and a serpentine rod 100, similar in construction to the lower and upper brackets 18, 56. In the preferred embodiment, the peripheral wall 95 includes a relatively straight span 102 extending between the corners 92, and a generally arcuate span 104 having ends secured to the same corners 92 supporting the straight span 102.

In the preferred embodiment, the shelves include the first shelf 90 having a floor 108 defined by a plurality of spaced, generally parallel shelf support rods 110 secured to the wall 95 by welding or other technologies as defined above. The rods 110 may be provided in sufficient number to create an item support surface, as in the lower bracket 18, or may also be designed to support a shelf insert 112, made of wood, plastic, or similar material. Alternatively, as in a second shelf 114, there is no floor 108. Instead, if an insert 112 is provided, it rests upon the upper shelf rod 96. Alternatively, the second shelf 114 may be used as a utensil hanging site, and/or as a handle for the cart 10.

It will also be seen that in at least one and preferably both of the first and second shelves 90, 114 the support corners 92 engage the corner posts 24 which are also engaged by the corresponding corners 60 of the upper bracket 56, so that the shelves 90, 114 project in opposite directions relative to the posts from the upper bracket.

Another feature of the present cart 10 is that a third pivoting shelf 116 is provided. Components shared with the first and second shelves 90, 114 are provided with identical reference numbers. The main distinguishing feature of the third shelf 116 is that it has only one corner 118 with a female frusto-conical formation 120 for engaging one of the male frusto-conical formations 26. Since only one attachment point is provided for the third shelf 116, it is pivotable relative to the corresponding corner post 24, and as such can be used to store condiments or other cooking supplies which are sporadically needed.

Still another attachment for the present cart 10 is a pivoting tool rack or towel rod 121 (FIG. 1) having a single female frusto-conical portion 120 for engagement upon one of the four corner posts 24 in the same manner as the third shelf 116. The towel rod 121 is preferably elongate in shape and includes a loop made of a single length of rigid rod, similar to the rod used to form the shelves 90, 114, 116. The rod 121 is secured to the female frusto-conical portion 120, as by welding.

Another feature of the present cart 10 is that preferably two of the corner posts 24 are provided at their lower ends 122 with a wheel 124. It is contemplated that the wheel 124 may be secured to the post with a transverse stub shaft (not shown) for independent rotation, or alternately that the wheels are tied to each other by an axle passing through a corresponding through bore in each of the lower ends 122. While it is preferred that only one pair of wheels 124 be provided so that the cart 10 is not free to move while cooking, it is also contemplated that in some applications wheels 124 may be provided to the lower ends 122 of all of the corner posts 24. Also, the lower ends 122 of the corner posts 24 not having wheels 124 are preferably provided with threaded feet 126 for adjusting the height of the cart 10. It is also contemplated that a supplemental work surface 128 may be provided in the event the barbecue 12 is removed from the cart 10, to convert the cart to a utility cart.

Figure 7:
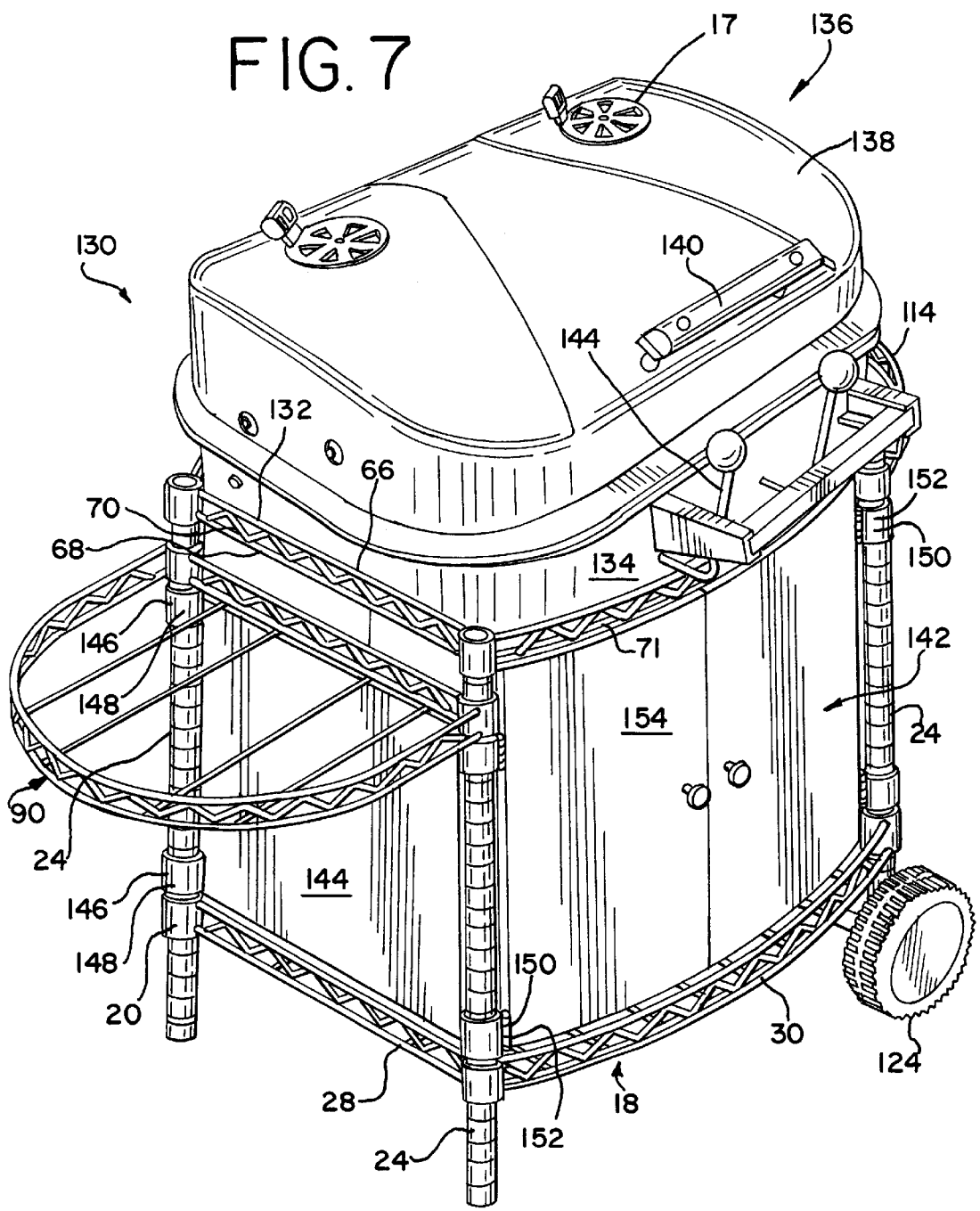
FIG. 7 is a top perspective view of an alternate embodiment of the barbecue cart shown in FIG. 1.

Referring now to FIG. 7, an alternate embodiment of the cart 10 is generally designated 130, and corresponding components are designated with identical reference numbers. One difference between the carts 10 and 130 is that the cart 130 lacks a kettle bracket 72. Instead, the upper bracket 132 itself is configured to tightly frictionally engage a bowl portion 134 of the barbecue 136, which in this case is generally rectangular when viewed from above. The barbecue 136 also has a lid 138, a handle 140, adjustable air vents 17 and grill height adjustment levers 144 as are known in the art.

Another difference between the carts 10 and 130 is that the cart 130 is provided with a cabinet 142 defined between the upper bracket 132 and the lower bracket 18. The cabinet is preferably made up of at least one and preferably two side walls 144, each having four vertically oriented corners 146 each having a female frusto-conical section shape 148 being configured to receive and securely hold one of the corner posts 24 having a male frusto-conical section shape 26. In the preferred embodiment, upper and lower female frusto-conical shapes 148 are in axial alignment with each other to register on the same corner post 24. In addition, each corner 146 has a hinge mounting 150 for receiving a huge 152 of a corresponding door 154. The shape and number of doors 154 may vary with the application, but it is contemplated that there be at least one front and one rear door, and two front doors 154 are shown in FIG. 7.

Figure 8:
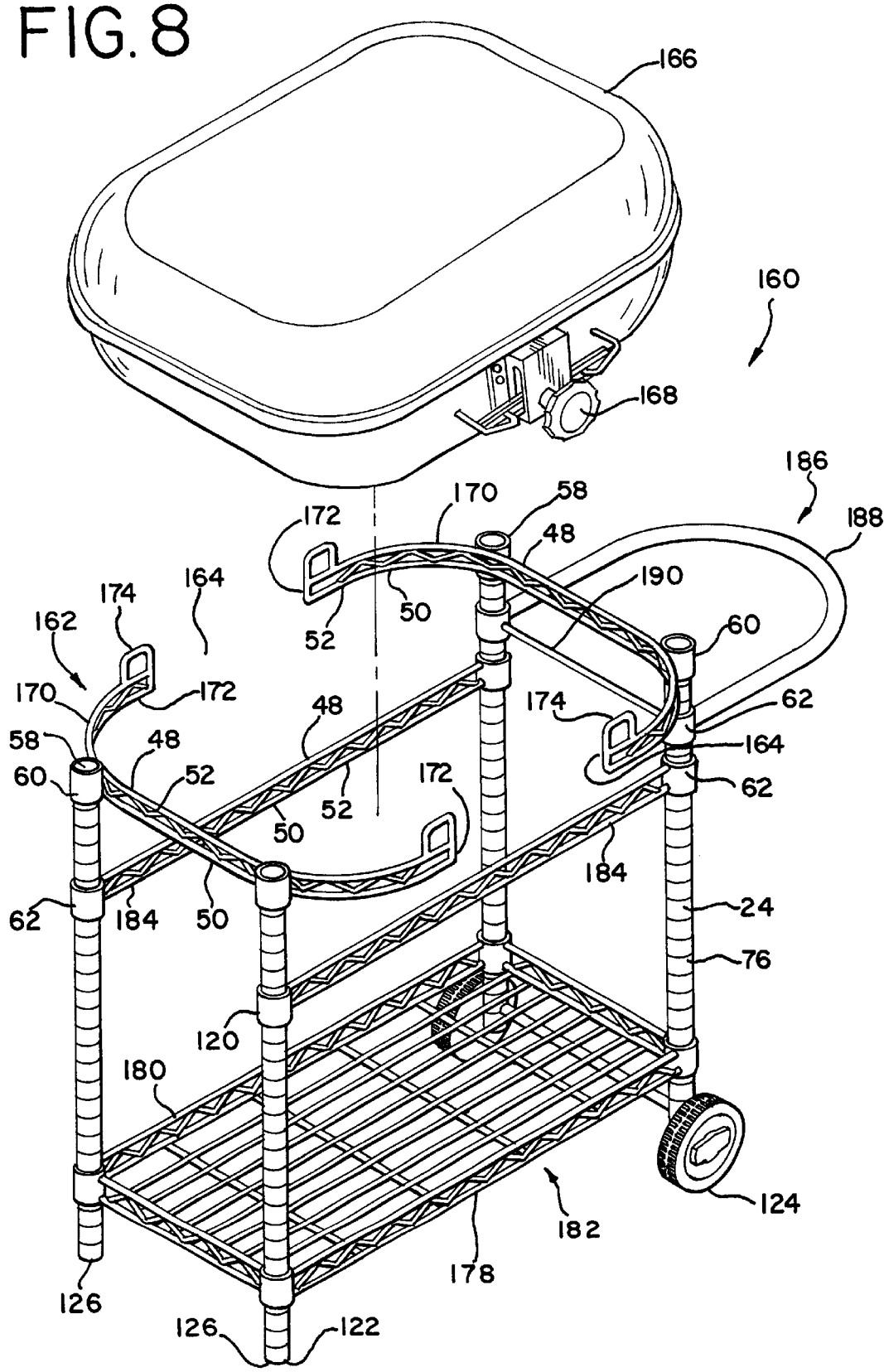
FIG. 8 is a top perspective view of another alternate embodiment of the barbecue cart shown in FIG. 1, with a kettle-type barbecue shown exploded therefrom.
Figure 9:
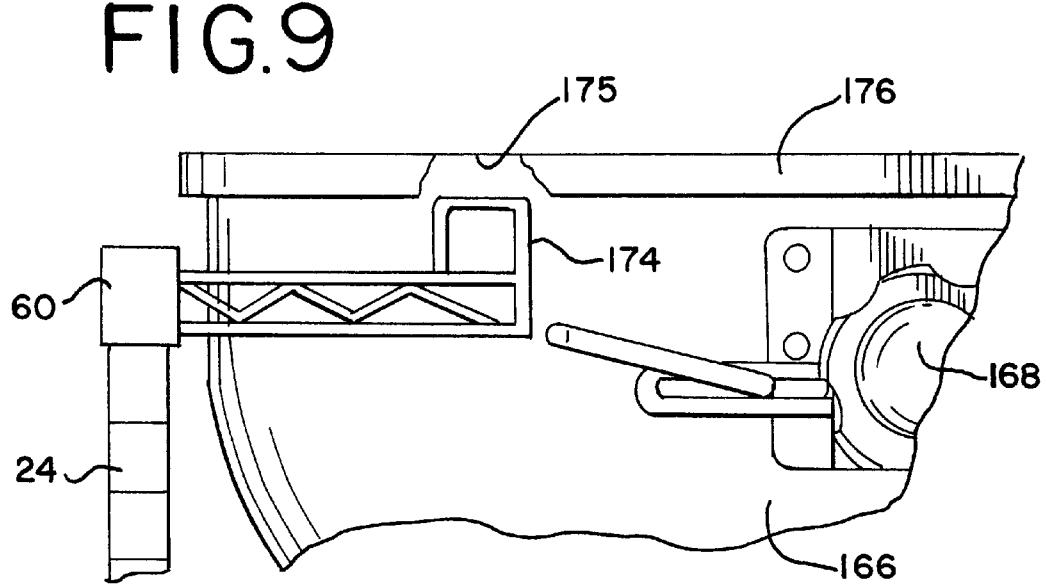
FIG. 9 is a fragmentary front elevational view of an assembly of the grill of FIG. 8.

Referring now to FIGS. 8 and 9, another alternate embodiment of the present barbecue cart is generally designated 160. Shared components found in the embodiments 10 and 130 are designated with identical reference numbers. A major differentiating feature of the cart 160 is that an upper bracket 162 defines a pair of gaps 164 for accommodating a barbecue kettle 166 having a front-mounted grill height adjustment mechanism 168. Since the mechanism 168 projects laterally from the kettle 166, the upper brackets 56, 132 from the embodiments 10, 130 would prevent the kettle from seating properly in the cart.

The upper bracket 162 includes a pair of generally "C"-shaped segments 170, each made of an upper rod 48, a lower rod 50 and a serpentine rod 52 sandwiched therebetween, as in the cart 10. Each segment 170 has a pair of free ends 172 provided with generally rectangular standoffs 174 preferably projecting from the upper rod 48. These standoffs 174 are configured and dimensioned to engage an underside 175 of an upper peripheral lip 176 of the kettle 166. The kettle 166 is thus retained in the cart 160 by a combination of a friction fit of the segments 170, which are configured to frictionally engage the exterior of the kettle, and the engagement of the four standoffs 174 with the lip 176.

Another distinguishing feature of the cart 160 is that front and rear edges 178, 180 of a lower bracket 182 are straight, not curved, and the lower bracket forms a rectangle when viewed from above. This configuration is especially suitable for use with the enclosed cabinet as depicted in the embodiment of FIG. 7. The rectangular configuration is preferably carried to the upper end of the cart 160, where a pair of upper supports 184 are provided to add stability and strength to the cart. Each upper support 184 is preferably made of the same metal rod as the lower bracket 18 and the segments 170, and includes upper and lower rods 48, 50 and a serpentine rod 52 sandwiched therebetween. At each end of the supports 184, a female frusto-conical formation 62 is provided for engaging the adjacent corner posts 24 as described above in relation to FIGS. 5 and 6. While the upper supports 184 provide side-to-side stability, the upper bracket "C"-shaped segments 170 provide the front-to rear stability, since each spans the upper ends 58 of adjacent corner posts 24 and is secured thereto with female frusto-conical portions 62. Also, as was the case with the carts 10 and 130, the first shelf 90, the second shelf 114, the third shelf 116 and/or the rod 121 may be provided to the cart 160, as may the other attachments described above. In FIG. 8, a modified second shelf is shown at 186, and includes a generally tubular handle portion 188 joined to a female frusto-conical portion 62 as by welding, and is supported by a transverse rod 190.

To assemble the carts 10, 130, 160 the same procedure is employed, however adding more attachments to be secured to the corner posts 24 requires that the various attachments be properly ordered when assembled upon the corner posts, so that the lower bracket 18, 182 is at the bottom and is assembled first, followed by the next highest component, such as the sidewall 144 or the pivoting third shelf 116. Next, one or more of the first and second shelves 90, 114 is engaged upon the corner posts 24, followed by the upper bracket 56, 132, 162. At each instance of a female frusto-conical portion 22, 62, 120 engaging a male frusto-conical member 26, a downward force is preferably applied to the object having the female portion to properly seat the components of the joint as depicted in FIG. 6 so that a tight friction fit is achieved. In some cases, a hammer or mallet may be used to ensure such a tight fit between the components.

Thus, it will be seen that the present invention provides a simple system for assembling a variety of barbecue carts, each capable of receiving one or more optional attachments, the precise positioning of the respective components depending on the desires of the user. Also, the present cart may be provided in alternate forms to accommodate a variety of shapes of barbecue kettles.

While a particular embodiment of the barbecue cart of the invention has been shown and described, it will be appreciated by those skilled in the art that changes and modifications may be made thereto without departing from the invention in its broader aspects and as set forth in the following claims.

What is claimed is:

1. A cart configured for receiving a kettle-type barbecue having a lid and a kettle portion, said cart comprising:

a lower bracket having at least three corners, each said corner having a first female frusto-conical section shape and being configured to receive and securely hold a corner post having a male frusto-conical section shape;

an upper bracket having at least three corners, each said corner having a second female frusto-conical section shape being configured to receive and securely hold a corner post having a male frusto-conical section shape, said upper bracket defining a space for receiving the kettle portion;

a plurality of corner posts having a plurality of spaced annular grooves;

said upper bracket being the only structure connecting the upper ends of each of said corner posts;

a plurality of male frusto-conical members configured for engaging said grooves and being disposed at a selected position on said corresponding corner post for engaging said female frusto-conical shapes on said corners;

a kettle bracket associated with said upper bracket being located in said space and configured for receiving the kettle portion of said barbecue in a frictional relationship; and at least one shelf having a pair of support corners, each said support corner having a female frusto-conical section shape and being configured to receive and securely hold one of said corresponding corner posts having a male frusto-conical section shape so that said shelf is cantilevered from said cart.

2. The cart as defined in claim 1 wherein the kettle portion is circular, and said kettle bracket is circular.

3. The cart as defined in claim 1 wherein said upper bracket is configured to have the shape of the kettle portion.

4. The cart as defined in claim 1 wherein said upper bracket is generally polygonal in shape when viewed from above, and said kettle bracket is circular.

5. The cart as defined in claim 1 wherein at least one of said shelves has corners which engage said corner posts which are also engaged by said corresponding corners of said upper bracket, so that said shelf projects in an opposite direction relative to said posts from said upper bracket.

6. The cart as defined in claim 1 further including at least one shelf having a single corner having a third female frusto-conical section shape and being configured to pivotally receive and securely hold one of said corner posts having a male frusto-conical section shape.

7. The cart as defined in claim 1 wherein said lower bracket includes a plurality of generally parallel, spaced load rods having first and second ends, a first support rod secured to a plurality of said first ends, and a second support rod secured to a plurality of said second ends; and a retaining wall secured to each of said support rods to project above a plane defined by said load rods.

8. The cart as defined in claim 7 wherein said retaining wall includes an upper rod, a lower rod spaced from said upper rod, and a serpentine rod disposed between and attached to said upper rod and said lower rod.

9. The cart as defined in claim 1 wherein said corner posts define a pair of sides, a front and a rear of said cart, and further including at least one side wall, having four vertically oriented corners each having a female frusto-conical section shape and being configured to receive and securely hold one of said corner posts having a male frusto-conical section shape.

10. The cart as defined in claim 9 wherein said side walls each have two pair of axially-oriented female frusto-conical shapes.

11. The cart as defined in claim 10 further including hinge mountings on at least two of said female frusto-conical shapes.

12. The cart as defined in claim 11 further including at least one door configured for engaging said hinge mountings.

13. The cart as defined in claim 1, further including two side panels and two doors attachable to said vertical posts for creating an enclosed cabinet.

14. The cart as defined in claim 1, further including a work surface configured for being attached to said upper bracket.

15. The cart as defined in claim 1, further including a pivotable towel rod having a female frusto-conical formation for engagement upon a selected one of said corner posts.

16. The cart as defined in claim 1 wherein said upper bracket is configured into two, generally "C"-shaped segments with separated free ends defining a gap.

17. The cart as defined in claim 1 wherein said upper bracket is provided with standoffs for engaging a peripheral lip on the kettle portion.

18. The cart as defined in claim 1 wherein said lower bracket is rectangular in shape when viewed from above.

19. The cart as defined in claim 1 further including a pair of upper supports for connecting adjacent corner posts.

20. A cart configured for receiving a kettle-type barbecue having a lid and a kettle portion, said cart comprising:

a lower bracket having at least three corners, each said corner having a first female frusto-conical section shape and being configured to receive and securely hold a corner post having a male frusto-conical section shape;

an upper bracket having at least three corners, each said corner having a second female frusto-conical section shape and being configured to receive and securely hold a corner post having a male frusto-conical section shape;

said upper bracket configured to support and frictionally retain both circular and polygonally shaped kettles while at the same time connecting the corner posts to hold together and support the cart;

a plurality of corner posts having a plurality of spaced annular grooves;

a plurality of male frusto-conical members configured for engaging said grooves and being disposed at a selected position on said corresponding corner post for engaging said female frusto-conical shapes on said corners;

at least one pair of wheels associated with the corresponding corner posts; and said upper bracket is configured into two, generally "C"-shaped segments with separated free ends defining a gap.

21. A cart configured for receiving a kettle-type barbecue having a lid and a kettle portion, said cart comprising:

a lower bracket having at least three corners, each said corner having a first female frusto-conical section shape and being configured to receive and securely hold a corner post having a male frusto-conical section shape;

an upper bracket having at least three corners, each said corner having a second female frusto-conical section shape and being configured to receive and securely hold a corner post having a male frusto-conical section shape;

a plurality of corner posts having a plurality of spaced annular grooves;

a plurality of male frusto-conical members configured for engaging said grooves and being disposed at a selected position on said corresponding corner post for engaging said female frusto-conical shapes on said corners;

a kettle bracket associated with said upper bracket and configured for receiving the kettle portion of said barbecue in a frictional relationship; and at least one shelf having a single corner having a third female frusto-conical section shape and being configured to pivotally receive and securely hold one of said corner posts having a male frusto-conical section shape.

22. A cart configured for receiving a kettle-type barbecue having a lid and a kettle portion, said cart comprising:

a lower bracket having at least three corners, each said corner having a first female frusto-conical section shape and being configured to receive and securely hold a corner post having a male frusto-conical section shape;

an upper bracket having at least three corners, each said corner having a second female frusto-conical section shape and being configured to receive and securely hold a corner post having a male frusto-conical section shape;

a plurality of corner posts having a plurality of spaced annular grooves;

a plurality of male frusto-conical members configured for engaging said grooves and being disposed at a selected position on said corresponding corner post for engaging said female frusto-conical shapes on said corners;

a kettle bracket associated with said upper bracket and configured for receiving the kettle portion of said barbecue in a frictional relationship; and said corner posts define a pair of sides, a front and a rear of said cart, and further including at least one side wall, having four vertically oriented corners each having a female frusto-conical section shape and being configured to receive and securely hold one of said corner posts having a male frusto-conical section shape.

23. A cart configured for receiving a kettle-type barbecue having a lid and a kettle portion, said cart comprising:

a lower bracket having at least three corners, each said corner having a first female frusto-conical section shape and being configured to receive and securely hold a corner post having a male frusto-conical section shape;

an upper bracket having at least three corners, each said corner having a second female frusto-conical section shape and being configured to receive and securely hold a corner post having a male frusto-conical section shape;

a plurality of corner posts having a plurality of spaced annular grooves;

a plurality of male frusto-conical members configured for engaging said grooves and being disposed at a selected position on said corresponding corner post for engaging said female frusto-conical shapes on said corners;

a kettle bracket associated with said upper bracket and configured for receiving the kettle portion of said barbecue in a frictional relationship; and said upper bracket is configured into two, generally "C"-shaped segments with separated free ends defining a gap.

24. A cart configured for receiving a kettle-type barbecue having a lid and a kettle portion, said cart comprising:

a lower bracket having at least three corners, each said corner having a first female frusto-conical section shape and being configured to receive and securely hold a corner post having a male frusto-conical section shape;

an upper bracket having at least three corners, each said corner having a second female frusto-conical section shape being configured to receive and securely hold a corner post having a male frusto-conical section shape, said upper bracket defining a space for receiving the kettle portion;

a plurality of corner posts having a plurality of spaced annular grooves;

said upper bracket being the only structure connecting the upper ends of each of said corner posts;

a plurality of male frusto-conical members configured for engaging said grooves and being disposed at a selected position on said corresponding corner post for engaging said female frusto-conical shapes on said corners;

a kettle bracket associated with said upper bracket being located in said space and configured for receiving the kettle portion of said barbecue in a frictional relationship; and said upper bracket is provided with standoffs for engaging a peripheral lip on the kettle portion.

* * * * *